(12) United States Patent
Harada

(10) Patent No.: US 7,920,996 B2
(45) Date of Patent: Apr. 5, 2011

(54) SLICED DATA STRUCTURE FOR PARTICLE-BASED SIMULATION, AND METHOD FOR LOADING PARTICLE-BASED SIMULATION USING SLICED DATA STRUCTURE INTO GPU

(75) Inventor: Takahiro Harada, Toride (JP)

(73) Assignee: Prometech Software, Inc., Tokyo (JP)

( * ) Notice: Subject to any disclaimer, the term of this patent is extended or adjusted under 35 U.S.C. 154(b) by 511 days.

(21) Appl. No.: 12/071,118

(22) Filed: Feb. 15, 2008

(65) Prior Publication Data

US 2009/0070079 A1 Mar. 12, 2009

(30) Foreign Application Priority Data

Sep. 11, 2007 (JP) ................. 2007-234989

(51) Int. Cl.
*G06F 17/00* (2006.01)
(52) U.S. Cl. .......................................................... 703/2
(58) Field of Classification Search .................. 345/420, 345/423, 419, 424; 703/2, 6
See application file for complete search history.

(56) References Cited

U.S. PATENT DOCUMENTS

| 5,594,671 | A | * | 1/1997 | Chen et al. .................... 703/6 |
|---|---|---|---|---|
| 5,848,260 | A | * | 12/1998 | Chen et al. .................... 703/5 |
| 6,089,744 | A | * | 7/2000 | Chen et al. .................... 703/2 |
| 7,098,907 | B2 | * | 8/2006 | Houston et al. ............ 345/419 |
| 7,298,372 | B2 | * | 11/2007 | Pfister et al. ............... 345/424 |
| 7,526,415 | B2 | * | 4/2009 | Shan et al. .................... 703/2 |
| 7,629,973 | B2 | * | 12/2009 | Oh et al. .................... 345/423 |
| 2003/0179196 | A1 | | 9/2003 | Hux |
| 2004/0070583 | A1 | | 4/2004 | Tsai et al. |
| 2005/0128195 | A1 | * | 6/2005 | Houston et al. ............ 345/419 |
| 2006/0142980 | A1 | * | 6/2006 | Shan et al. .................... 703/2 |
| 2007/0132758 | A1 | * | 6/2007 | Oh et al. .................... 345/420 |
| 2007/0133865 | A1 | | 6/2007 | Lee et al. |
| 2008/0319722 | A1 | * | 12/2008 | Anderson .................... 703/2 |

OTHER PUBLICATIONS

Tanaka et al., "Development of a rigid-body calculation method using a particle method, and application thereof to computer graphics," *Japan Society of Mechanical Engineers, Papers of the 19th Computational Mechanics Conference*, 2006, pp. 701-702.
Harada et al., "Real-time Fluid Simulation Coupled with Cloth," *Theory and Practice of Computer Graphics*, 2007.
Harada et al., "Smoothed Particle Hydrodynamics on GPUs," *Computer Graphics International*, 2007, pp. 63-70.
Saad, "SPARSKIT: a basic tool kit for sparse matrix computations," Version 2, Jun. 6, 1994.
Jul. 28, 2010 Office Action issued in German Patent Application No. 10 2008 034 519.9-53 (English-language translation only).

* cited by examiner

*Primary Examiner* — Hung T Vy
(74) *Attorney, Agent, or Firm* — Oliff & Berridge, PLC

(57) ABSTRACT

The sliced data structure used for a particle-based simulation using a CPU or GPU is a data structure for a calculation space. The space is a three-dimensional calculation space constructed from numerous voxels; a plurality of slices perpendicular to the Y axis is formed; numerous voxels are divided by a plurality of two-dimensional slices; the respective starting coordinates of the maximum and minimum voxels are calculated for a range of voxels in which particles are present in each of a plurality of two-dimensional slices; the voxel range is determined as a bounding box surrounded by a rectangular shape; and memory is provided for the voxels contained in the bounding boxes of each of the plurality of two-dimensional slices.

8 Claims, 9 Drawing Sheets

SLICED DATA STRUCTURE FOR PARTICLE-BASED SIMULATION, AND METHOD FOR LOADING PARTICLE-BASED SIMULATION USING SLICED DATA STRUCTURE INTO GPU

BACKGROUND OF THE INVENTION

1. Field of the Invention

The present invention relates to a sliced data structure used for a particle-based simulation based on a fluid calculation method using particles, which improves the memory efficiency for a method using a calculation grid used in a proximity search, and which improves the efficiency of a proximate particle search, and to a method for loading a particle-based simulation utilizing a sliced data structure into a GPU.

2. Description of the Related Art

The term "particle-based simulation" refers to a simulation method for performing calculations in which the physical object constituting the object of simulation is taken as a collection (aggregation) of numerous particles, and calculations are performed noting the individual behavior of the numerous particles. In calculations performed by a computer, "spheres" having a fixed diameter are ordinarily used as the abovementioned particles. In cases where the shape of the physical object is expressed by an aggregation of spheres, the degree of approximation or degree of spatial resolution of the physical object varies depending on the method used to determine the size (diameter) of these spheres. Furthermore, the degree of calculation precision and calculation speed in simulation calculations performed by a computer can be controlled by varying the diameter of the spheres, or varying the degree of spatial resolution.

In recent years, calculation of the behavior of fluids and the like has been performed utilizing the abovementioned particle-based simulation, and research on simulations of fluids and the like has been performed on the screens of computer display devices. Literature in which this research is disclosed includes Masayuki Tanaka et al., "Development of rigid body calculation method using particle method, and application to computer graphics," Japan Society of Mechanical Engineers, Collection of Papers Presented at 19th Conference on Computational Power, pp. 701-702, 2006. Research on particle-based simulation techniques is important as a fundamental technique for computer graphics (CG).

Fluid simulation methods using the particle method include the MPS method (moving particle semi-implicit method) and SPH (smoothed particle hydrodynamics). In the MPS method, non-compressed flow is calculated by solving Poisson's equations derived from simultaneous equations; in SPH, quasi-non-compressed flow is calculated without setting non-compressed conditions. Accordingly, the MPS method has higher calculation costs than the SPH. Consequently, SPH methods constitute the mainstream in the field of computer graphics.

In the particle-based simulation research, mainly a method in which a calculation algorithm was prepared utilizing a CPU was widely used in the past. In recent years, however, research on particle-based simulations utilizing a GPU (graphic processing unit: generally a streaming processor) has also been underway. A GPU has a construction in which calculation processing is performed in parallel by a plurality of processors internally in order to make a special adaptation for graphics processing. Accordingly, in the case of processing of coordinate conversion of vertices and the like, a GPU can perform processing at a much higher speed than a CPU. Furthermore, a GPU can control processing by writing a program called a shader; accordingly, a GPU can also be used in various types of processing other than graphics. Accordingly, there have also been attempts to increase the speed of the calculations used in particle-based simulations using a GPU. For example, the inventors developed a method in which a GPU is used to perform all SPH simulations. Literature disclosing this method includes T. Harada, S. Koshizuka, and Y. Kawaguchi, Real-time Fluid Simulation Coupled with Cloth, Proc. Of Theory and Practice of Computer Graphics, 2007, and T. Harada, S. Koshizuka, and Y. Kawaguchi, Smoothed Particle Hydrodynamics on GPUs, Proc. Of Computer Graphics International, pages 63-70, 2007.

In the abovementioned method proposed by the present inventor, a grid fixed in space was used to search for proximate particles in particle-based simulations; accordingly, the following problems were encountered: namely, the memory efficiency was poor, and limitations were generated in regard to the calculation area.

For example, in fluid calculation methods using particles, unlike fluid calculation methods using a grid, a calculation grid is generally not used; accordingly, the following advantages are obtained: namely, fine droplets and the like can also be easily calculated, and the actual fluid behavior can be expressed. Meanwhile, in fluid calculation methods using grids, the disposition of the particles is altered dynamically without any connection between calculated particles; accordingly, processing that searches for particles present in the vicinity of certain coordinates is necessary in respective time steps in order to calculate physical quantities at such coordinates.

In order to perform a proximate particle search in an efficient manner, an increase in efficiency can be achieved by disposing a grid in the calculation area (calculation grid), and storing the numbers of certain particles in voxels (also called buckets or grids) containing these particles. Generally, calculation grids are prepared so that the calculation area is enveloped.

Generally, when a calculation grid is fixed and prepared in the above operation, there are many voxels in which particles are not present in cases where the particle distribution varies in the calculation area of a fluid, and the memory use efficiency is poor. There are limits to the size of memories in which simulation programs can be used; accordingly, as the size of the memory used in the calculation grid is reduced, the memory that can be used for particles that express the fluid increases, and a larger-scale fluid simulation can be performed.

Because of the abovementioned problems, there is a demand to increase the memory efficiency of the calculation grid used in the search for proximate particles in particle-based simulations.

SUMMARY OF THE INVENTION

In light of the above problems, it is an object of the present invention to provide a sliced data structure for a fluid calculation method using particles, which improves the memory use efficiency for a method using a calculation grid used in a proximity particle search, and which can improve the efficiency of a proximate particle search.

It is another object of the present invention to provide a method for loading into a GPU a particle-based simulation utilizing a sliced data structure that allows the easy loading into a GPU of the sliced data structure that can improve the memory use efficiency.

In order to achieve the objects described above, the sliced data structure for a particle-based simulation provided by the present invention is constructed as follows:

The sliced data structure for a particle-based simulation is a data structure for a space used in the calculation of a particle-based simulation using a CPU, GPU, or the like. The space is three-dimensional calculation space constructed from numerous voxels. The numerous voxels (a grid) are divided into a plurality of two-dimensional sliced areas by forming a plurality of two-dimensional sliced areas (slices) perpendicular to a single arbitrary axis in a three-dimensional calculation space. In the plurality of two-dimensional sliced areas, the maximum and minimum voxel starting coordinates are calculated for voxel ranges in which the particles are present, thereby determining rectangular ranges (bounding boxes) for enclosing those areas in which particles are present using a rectangular shape. Memory is provided for voxels contained in the rectangular ranges of each of the plurality of two-dimensional sliced areas.

In the sliced data structure for a particle-based simulation, values that specify the particles (e.g., particle numbers or the like) are stored in storage elements of the memory provided for the voxels in which the particles are present in the construction described above.

In the sliced data structure for a particle-based simulation, the calculation of the voxel numbers v(x, y, z) of the voxels in which certain points (x, y, z) in the rectangular ranges of each of the plurality of two-dimensional sliced areas are present in the above configuration is performed using a value that define the rectangular ranges of each of the two-dimensional sliced areas, a value that determines the slice numbers, or a header number.

In the sliced data structure for a particle-based simulation provided by the present invention, the calculation of the particle-based simulation is a calculation of a proximate particle search, and the three-dimensional calculation space is divided by the two-dimensional sliced areas in order to make the calculation of the proximate particle search more efficient, in the construction described above.

In the sliced data construction for a particle-based simulation, a GPU is used to perform the calculation in which the three-dimensional calculation space is divided by the two-dimensional sliced areas for the calculation of the particle-based simulation, in the construction described above.

The method for loading a particle-based simulation utilizing a sliced data structure into a GPU is a method for constructing a data structure used to increase efficiency of a calculation of a proximate particle search of the particle-based simulation, storing data, which are required in order to perform a proximate particle search on a GPU using this data structure, into a video memory as an array, and loading the array into the GPU. This method comprises the steps of forming a plurality of two-dimensional sliced areas perpendicular to a single arbitrary axis in a three-dimensional calculation space constructed using numerous voxels, and dividing the numerous voxels by the plurality of two-dimensional sliced areas; calculating respective starting coordinates of maximum and minimum voxels for a range of voxels in which particles are present in each of the plurality of two-dimensional sliced areas, and thereby determining a rectangular range for enclosing the voxel range using a rectangular shape; preparing at least a one-dimensional array; storing, in the elements (GPU: RGBA channels) of the array, four values that are minimally required in order to define each of the plurality of two-dimensional sliced areas; preparing a two-dimensional array; and storing a particle number of the particles in the two-dimensional array.

In this method for loading into a GPU, a texture is used as the array when a shader is used in the loading of the program into the GPU.

In the loading method described above, the four minimum values are the number $p_i$ of the head voxel in an arbitrary two-dimensional sliced area (i), the starting coordinates $bx_{i,min}$ and $bz_{i,min}$ of the minimum voxel, and the number of voxels $nx_i$ in a specified axial direction.

In the present invention, a fixed grid is not used; instead, the three-dimensional calculation space is divided into two-dimensional sliced areas perpendicular to a single axial direction, and the voxels stored in the memory are limited using the approach of specified rectangular ranges, i.e., bounding boxes. Accordingly, a video memory such as a GPU or the like can be utilized with good efficiency, the memory efficiency of voxels (a grid) used in the proximate particle search of a particle simulation using a GPU or the like can be improved, and the proximate particle search can be made more efficient.

BRIEF DESCRIPTION OF THE DRAWINGS

These and other objects and features of the present invention will become clearer from the following detailed description of the preferred embodiments of the present invention made with reference to the accompanying drawings, wherein.

DESCRIPTION OF THE PREFERRED EMBODIMENTS

Appropriate embodiments of the present invention will be described below with reference to the accompanying drawings.

Figure 1:
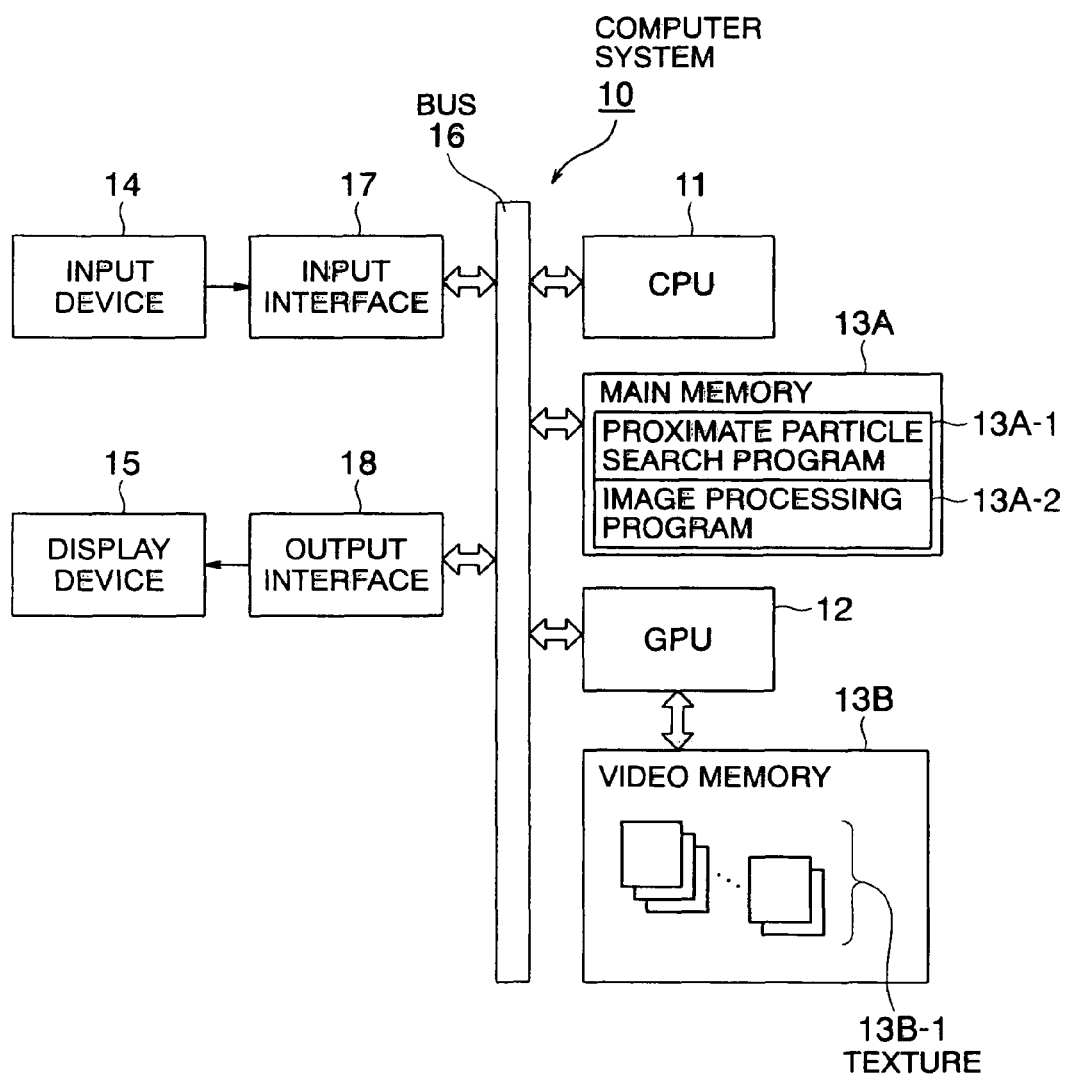
FIG. 1 is a system construction diagram showing the basic construction of a computer system in which the particle-based simulation of the present invention is executed.

FIG. 1 shows the construction of a computer system using a sliced data structure in the calculation of a proximate particle search in a particle-based simulation using a GPU, in which a simulation method constructed utilizing this sliced data structure is performed.

For example, the computer system 10 is constructed utilizing a PC (personal computer), and comprises a CPU 11 for performing the calculation processing of an ordinary computer as a calculation processing unit, and a GPU 12 for performing calculation processing specifically adapted to image processing. Furthermore, the computer system 10 comprises a main memory 13A and a video memory (VRAM) 13B as memory devices, and comprises at least an input device 14 and a display device 15 as peripheral devices.

The CPU 11, GPU 12, main memory 13A, input device 14, and display device 15 are connected to each other via a bus 16. The input device 14 is connected to the bus 16 via an input interface 17, and the display device 15 is connected to the bus 16 via an output interface 18. Furthermore, the video memory 13B is directly connected to the GPU 12. The exchange of data with the video memory 13B is performed via the GPU 12.

In the present embodiment, furthermore, the programming method used by the GPU 12 has a construction using a shader.

For example, the CPU (central calculation processing unit) 11 is an ordinary calculation processing unit mounted in a PC or the like. Furthermore, the GPU 12 is a "graphics processing unit," and performs image calculation processing. For example, a "Core X6800" is used as the CPU.

The GPU 12 contains a plurality of processors, and is used as a parallel calculator. For example, a "GeForce 8800GTX" manufactured by NVIDIA Co. is used as the GPU 12. Furthermore, the product used as the GPU 12 is not limited thereto; another streaming processor having a similar structure and function can also be used. This GPU 12 executes a proximate particle search program 13A-1 stored in the main memory 13A, and performs proximate particle search calculations in the particle-based simulation. The proximate particle search program 13A-1 constructs a data structure used in the proximate particle search. The method used to construct the data structure having the characteristic structure of the present invention will be described in detail later.

Furthermore, the GPU 12 executes an ordinary image processing program 13A-2 stored in the main memory 13A, performs image processing using image data obtained by the calculation of the proximate particle search and stored in the texture, and performs drawing (rendering for display) on the screen of the display device 15 using the prepared image data. A CG image is displayed on the screen of the display device 15 on the basis of the calculation of the particle-based simulation.

In the following description of the present embodiment, for example, an example of the calculation of a fluid simulation based on a particle-base simulation is described. In the calculation of this fluid simulation, a method used to construct a data structure used in the proximate particle search is performed utilizing mainly the characteristic internal structure and functions of the GPU 12. As is shown later, the data structure described in the present embodiment is called a "sliced data structure (or sliced base data structure)". Furthermore, this can also be executed using a CPU.

Figure 2:
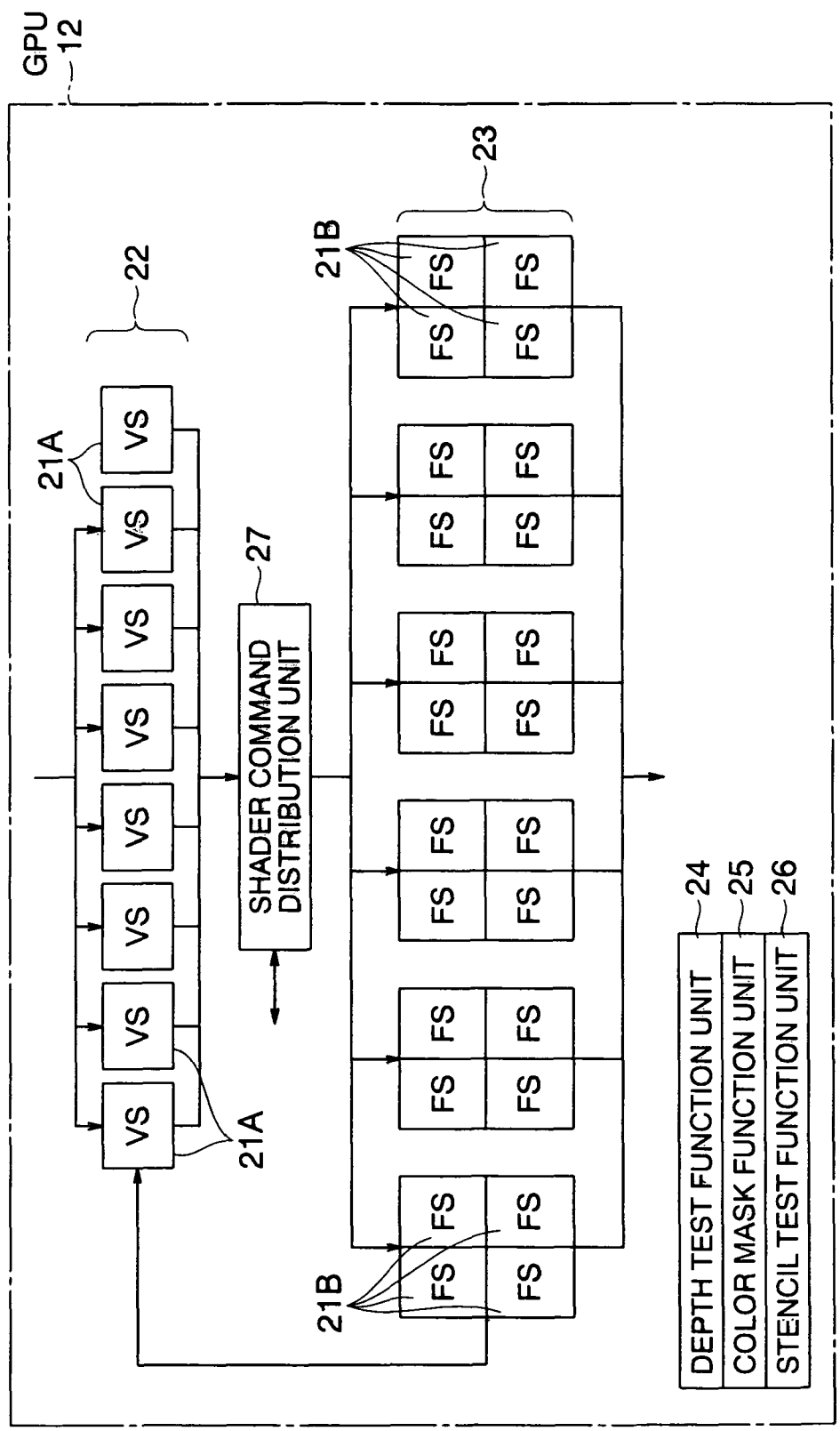
FIG. 2 is a block diagram showing the basic construction of the internal unit of a GPU mounted in the computer system.

Next, the basic structure of the essential units inside the GPU 12 will be described with reference to FIG. 2. FIG. 2 is a block diagram which shows the internal structure of the GPU 12 in schematic form. The GPU 12 comprises a plurality of processors 21 disposed in parallel; rendering for the purpose of display (drawing of images) is performed on the basis of parallel calculation processing by these processors. In particular, in the method used for the construction of the data structure (construction of voxels (or buckets)) used in the proximate particle search of the present embodiment, in a case where four particles are present in one voxel, the particle numbers of the four particles are respectively written into the RGBA channels of the single voxel. An increase in the speed of the image calculation processing is realized by the processing of the construction of these voxels in the GPU 12.

For example, the GPU 12 ordinarily has eight vertex shaders (VS) 22 disposed in parallel in the forward stage, and 24 fragment shaders (FS) 23 disposed in parallel in the rear stage. The programs executed by each of the plurality of vertex processors (21A) are vertex shaders 22, and the programs executed by each of the fragment processors (21B) are fragment shaders 23.

In the above, the vertex processors are processors that are disposed in parallel, and are especially adapted to the processing numerous vertex coordinate conversions (conversion of the input vertex coordinates to coordinates in the space of the rendered image) at one time. The GPU 12 can calculate the vertex coordinate conversion at a higher speed than the CPU. The device designating the operation of the vertex processors is a vertex shader.

Furthermore, the GPU 12 comprises a depth test functional unit 24, a color mask functional unit 25, and a stencil test functional unit 26. Furthermore, the block 27 is a shader command distribution unit.

The basic concept of the "sliced data structure" as the data structure of the present embodiment used in a particle-based simulation using the GPU 12 will be described.

Figure 3:
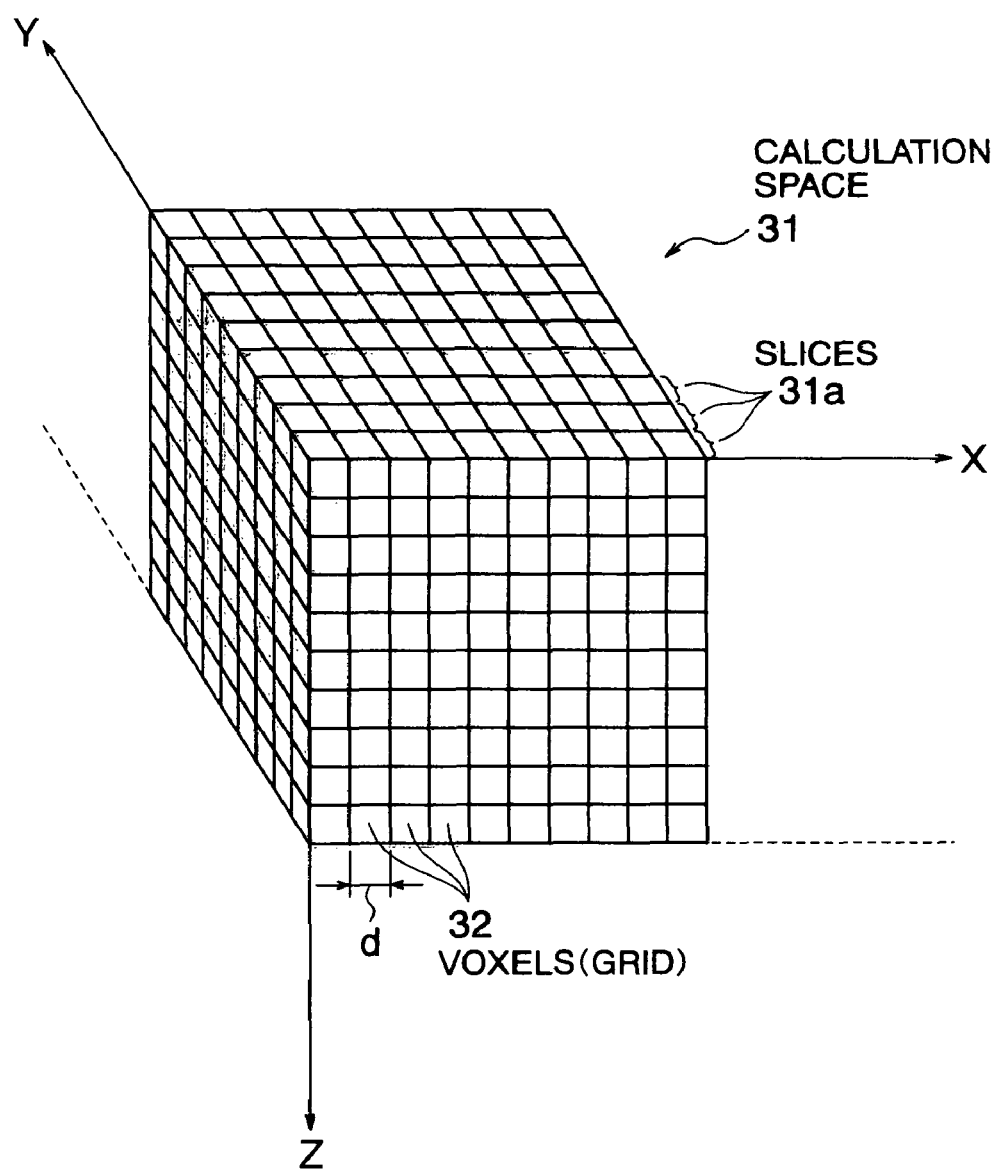
FIG. 3 is a perspective view showing the three-dimensional calculation space.

In fluid calculations based on the particle method, a space (or area) used in the calculation of the proximate particle search executed in respective time steps is set. This space is called the "calculation space". As is shown in FIG. 3, this calculation space is a three-dimensional space 31 which is defined by three axes, i.e., the X axis, Y axis, and Z axis, that are perpendicular to each other. Numerous grids 32 are prepared in the calculation space 31. The numerous grids 32 are small cubic bodies which: form the calculation space 31, and which are "d" on one side. In the description of the present embodiment, these grids 32 will be called "voxels". "Voxels" may also be called "buckets" or "grids".

The numerous grids, i.e., voxels 32, have an infinite spread, and the disposition of the grids in the calculation space 31 is not altered during calculations. In the calculation method of the present embodiment, only the necessary voxels among the numerous voxels 32 forming the calculation space 31 are held in the video memory 13B, as will be described later.

Furthermore, in cases where a fixed grid is used as in conventional calculation methods, a bounding box used as a calculation area is set in the calculation space, and memory is provided for voxels in the interior of this bounding box regardless of the presence or absence of particles. In other words, memory is provided even for voxels in which no particles are present. In the calculation method of the present embodiment, on the other hand, memory is provided as a rule for voxels in which particles are present.

In the calculation method of the present invention, first, a plurality of slices 31a perpendicular to a single axis is formed in the calculation space 31, and the numerous voxels 32 prepared in the calculation space 31 are divided so as to be contained in each of the plurality of slices 31a. The respective slices 31a are in two dimensions, which is one dimension lower than the dimensions of the calculation space 31 (three dimensions). The dimension corresponding to the thickness of the respective slices 31a is substantially equal to one side (d) of the voxels 32. In other words, in the direction of the single axis to which the slices 31a are perpendicular, only a single voxel is present. For example, a single arbitrary axis such as the X axis, Y axis, Z axis, or the like can be selected as this "single axis." For instance, when the Y axis is selected as the "single axis," the slices 31a are two-dimensional spaces that extend in the direction of the XZ plane determined by the X and Z axes. Below, an example will be described in which the three-dimensional calculation space 31 is divided into two-dimensional slices 31a perpendicular to the Y axis.

After the calculation space 31 has been divided into a plurality of slices 31a, bounding boxes for the X and Z axial directions are defined by the respective slices 31a. These bounding boxes refer to ranges set off by boundaries for confirming as narrowly as possible using rectangular areas those areas in which particles are present within a single slice 31a. The definition of bounding boxes in such a slice 31a refers to the calculation of the maximum and minimum voxel starting coordinates $bx_{i,max}$, $bx_{i,min}$, $bz_{i,max}$, $bz_{i,min}$ in the X and Z axial directions. Here, "i" refers to a number defining the slice. Here, by calculating the maximum and minimum voxel starting coordinates $bx_{i,max}$, $bx_{i,min}$, $bz_{i,max}$, $bz_{i,min}$ in the X and Z axial directions, it is possible to determine the number of voxels contained in the bounding box of the single slice 31a, i.e., the numbers of voxels $nx_i$ and $nz_i$ in the X and Z axial directions contained in the slice 31a, using the following Eqs. (1) and (2) of Formula 1.

(Formula 1)

$$nx_i = \frac{bx_{i,max} - bx_{i,min}}{d} + 1 \qquad (1)$$

$$nz_i = \frac{bz_{i,max} - bz_{i,min}}{d} + 1 \qquad (2)$$

By using $nx_i$ and $nz_i$, it is possible to determine the number of voxels $n_i$ in the slice 31a having a number of i as $n_i = nx_i \times nz_i$. In the calculation method of the present embodiment, memory is provided for the voxels of only the area inside the bounding box in each slice.

Here, the calculation space 31 is broken down into n slices $[S_0, S_1, S_2, \ldots, S_{n-1}]$. The number $p_i$ of the head voxel in the initial slice $S_i$ is calculated using Eq. (3) of the following Formula 2 as the sum of the numbers of voxels in the slices $S_0$ through $S_{i-1}$.

(Formula 2)

$$p_j = \sum_{j<i} n_j \qquad (3)$$

Figure 4:
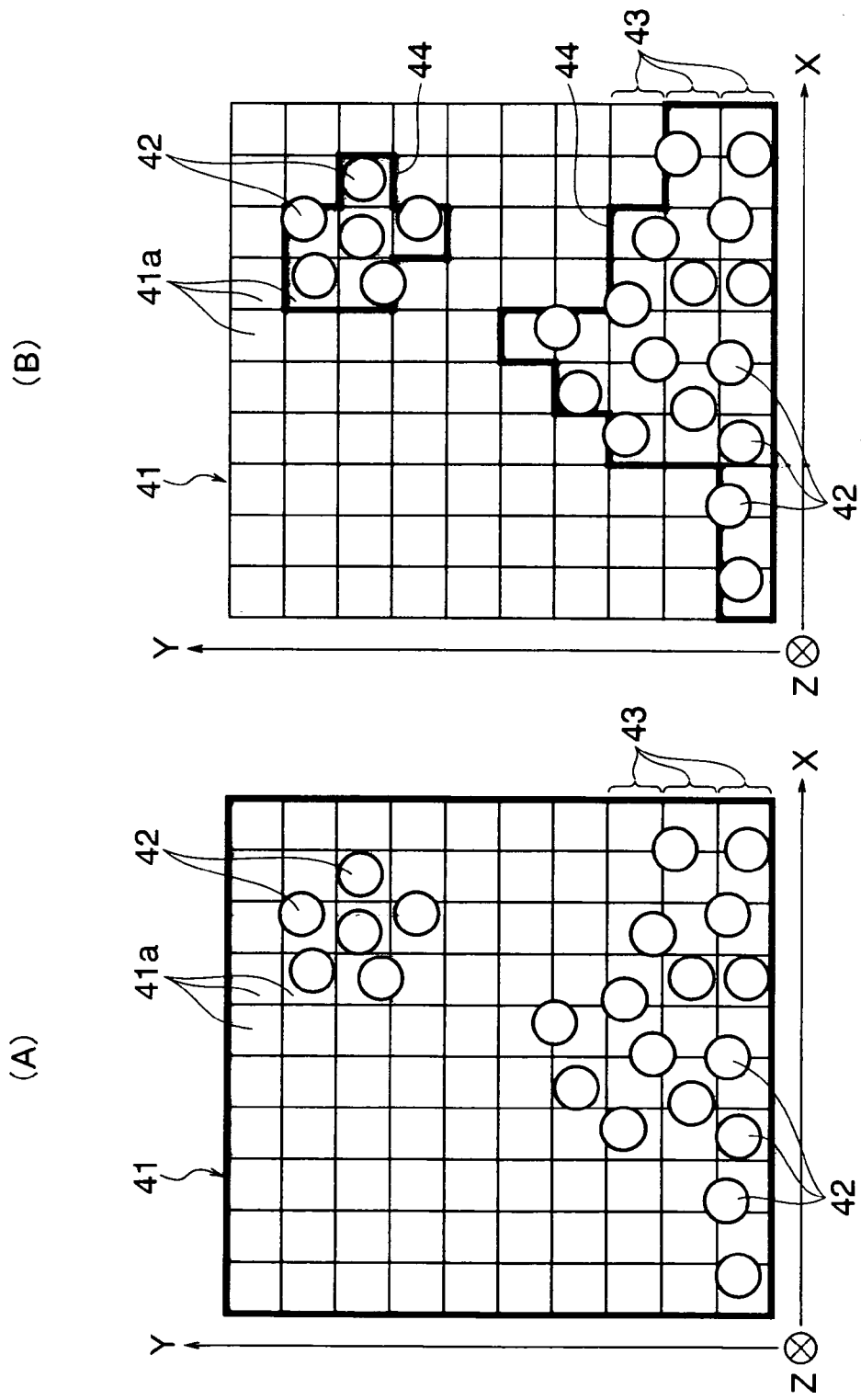
FIG. 4 is an explanatory diagram showing a comparison of a conventional fixed grid (A) and the method (B) used to determine the grid (voxels) used in the present embodiment.

FIG. 4 shows an example (A) of the bounding box used in a case where a fixed grid structure is used according to a conventional calculation method, and an example (B) of the bounding box used to determine voxels in the calculation method of the present embodiment. In FIGS. 4(A) and 4(B), the X axis, Y axis, and Z axis are defined as shown in the drawings. FIGS. 4(A) and 4(B) show this as a single square surface (XY plane) in a single XY axial direction perpendicular to the Z axial direction. In FIGS. 4(A) and 4(B), the small square shapes 41a within the ranges determined by the square shapes 41 indicate single voxels, and the circles 42 further indicate particles that are present inside the voxels. Accordingly, voxels in which particles 42 are present and voxels in which no particles 42 are present are contained in the ranges of the square shapes 41.

The layer-form units indicated by the numeral 43 that are perpendicular to the Y axial direction in FIGS. 4(A) and 4(B) correspond to the above-mentioned slices 31a.

The numerals 41a, 42, and 43 in FIG. 4 do not indicate every unit; numerals are not attached to other units of the same type.

In a conventional calculation method, since a fixed grid structure is used, the system is constructed so that memory is provided for all of the voxels contained in the square areas 41 (indicated by thick solid lines) regardless of the presence or absence of particles, as is shown in FIG. 4(A). Specifically, it is necessary to ensure memory even for the numerous voxels in which no particles 42 are present. In the calculation method of the present embodiment, on the other hand, the system is constructed so that memory is provided for voxels contained in areas 44 (indicated by thick solid lines) prepared by the synthesis of bounding boxes defined by the respective slices, i.e., areas 44 that are narrowly constructed so as to include as far as possible only voxels in which particles 42 are present.

Forming bounding boxes as described above by using the slices with for the calculation space 31 makes it possible to calculate as follows the numbers of voxels in which certain points (x, y, z) are present.

First, using the starting coordinate $by_{min}$ of the minimum voxel in the Y axial direction, the number i of the slice in which this point is contained is calculated using Eq. (4) of the following Formula 3.

(Formula 3)

$$i = \left[ \frac{y - by_{min}}{d} \right] \qquad (4)$$

Then, the voxel number v(x, y, z) of the point (x, y, z) is calculated using Eq. (5) of the following Formula 4.

(Formula 4)

$$v(x, y, z) = p_i + \left( \left[ \frac{x - bx_{i,min}}{d} \right] + \left[ \frac{z - bz_{i,min}}{d} \right] nx_i \right) \qquad (5)$$

In this way, the numbers of voxels in which the abovementioned point (x, y, z) is present are calculated. Referring to Eq. (5), it is seen that the values that are required in order to calculate the numbers of the voxels in which certain points are present are the values $bx_{i,min}$, $bz_{i,min}$, and $nx_i$ that define the bounding boxes of the respective slices, the value $by_{min}$ that determines the slice number, the head numbers $p_i$ of the respective slices, and the length d of one side of each voxel. When the data structure utilizing slices is used, voxels (grids) can be constructed using the memory with good efficiency as shown in FIG. 4(B).

A "sliced data structure," which is the characteristic data structure of the calculation method of the present embodiment, is thus constructed. In order to actually construct the abovementioned sliced data structure, the bounding boxes of each of n slices $[S_0, S_1, S_2, \ldots, S_{n-1}]$ are determined, and the head numbers of respective slices are calculated from the determined bounding boxes. Furthermore, after the four values ($p_i$, $bx_{i,min}$, $bz_{i,min}$, $nx_i$ required for the calculation of the voxel numbers v(x, y, z) have been determined, these values are written into the voxels. These four values are the minimum values required for the definition of the bounding boxes; such values are not limited to these values alone.

Next, a system which is loaded into the GPU 12 so that a calculation method based on the abovementioned sliced data structure can be performed using the GPU 12 will be described.

Figure 5:
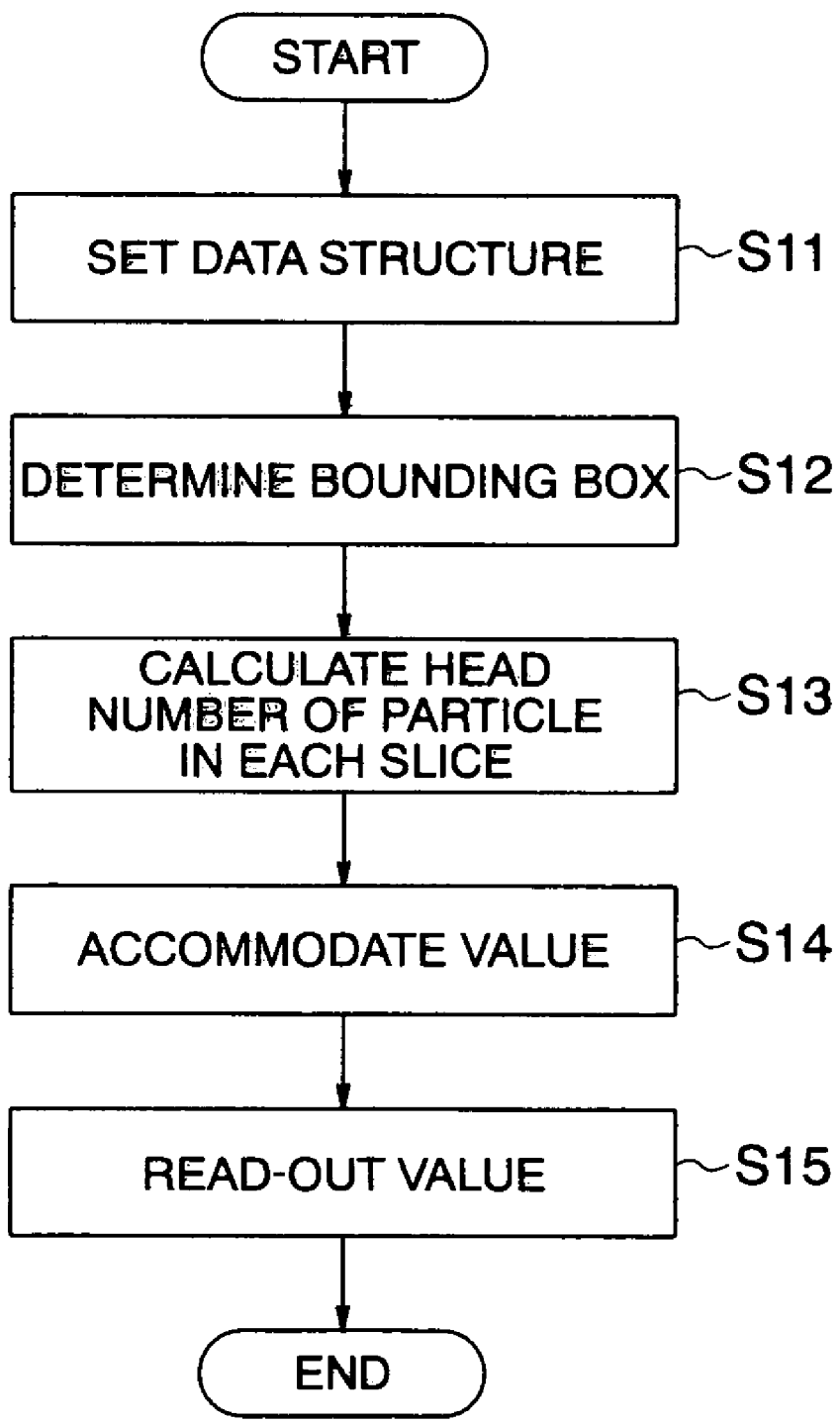
FIG. 5 is a flow chart showing the procedure used to load the calculation method according to the sliced data structure into a GPU.

The loading of the calculation method of the present embodiment using the GPU 12 is shown in FIG. 5. As is shown in FIG. 5, this comprises five steps, i.e., a step (S11) for setting the data structure in the video memory 13B, a step (S12) for setting the bounding boxes in each of the numerous slices 31a dividing the calculation space 31, a step (S13) for calculating the head numbers of the particles in each of the slices 31a, a step (S14) for storing the values, and a step (S15) for reading out the values.

Furthermore, the sliced data structure can be understood in terms of the construction of the sliced data structure and the utilization of the sliced data structure. The construction of the sliced data structure involves setting the data structure, determining the bounding boxes, calculating the head numbers, and storing the values in the five steps S11 through S15. Furthermore, the utilization of the sliced data structure can be interpreted as reading the values in the five-steps S11 through S15.

Below, the content of the processing in the five steps S11 through S15 will be described in the five steps S11 through S15.

Step of Setting the Data Structure S11

Figure 6:
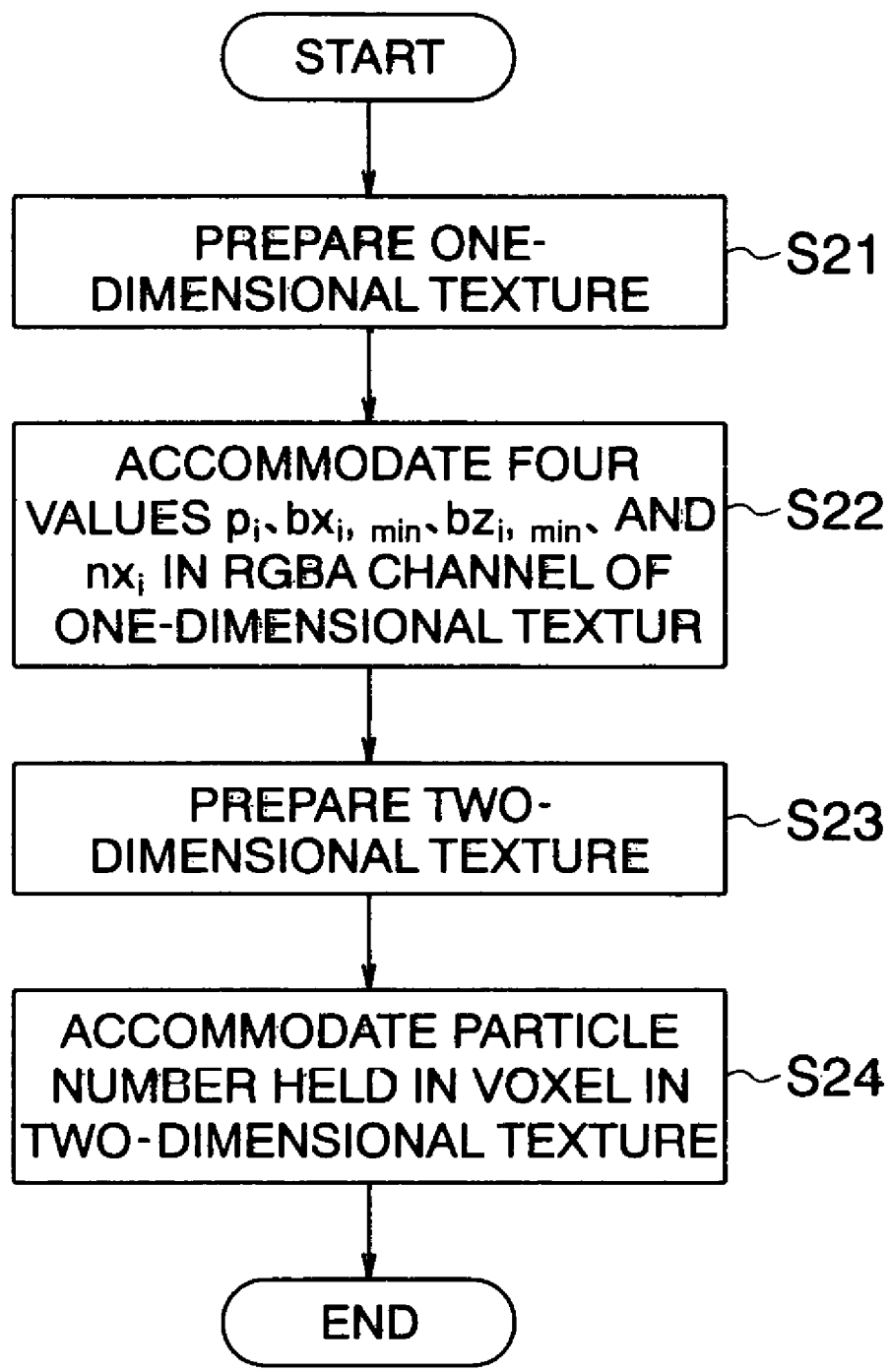
FIG. 6 is a flow chart showing a more concrete procedure for the step of setting the data structure.

First, the data structure that allows loading into the GPU 12 will be described with reference to the processing flow shown in FIG. 6. In order to perform calculations in the GPU 12, it is necessary to store data relating to the slices, voxels, and particles in the calculation space as a texture 13B-1 in the video memory 13B.

As was described above, the calculation space 31 is divided into a plurality of slices 31a, and a one-dimensional texture is accordingly prepared in order to accommodate the necessary values for the plurality of slices 31a; i.e., the four values $p_i$, $bx_{i,min}$, $bz_{i,min}$, and $nx_i$ (step 21). In cases where the number of the plurality of slices 31a exceeds the maximum value of the size of the one-dimensional texture, it would also be possible to use a two-dimensional texture. The four values $p_i$, $bx_{i,min}$, $bz_{i,min}$, and $nx_i$ required for each slice 31a are stored in a single RGBA channel of the one-dimensional texture (step S22). Storage is accomplished using an RGBA channel. For this reason, a single texture is ordinarily sufficient.

Moreover, a two-dimensional texture is prepared in order to accommodate the values held in the grid, i.e., voxels (step S23). In the example of the present embodiment, the values held in the voxels are particle numbers. The two-dimensional texture is utilized, and the particle numbers held in the voxels are stored (step S24). The two-dimensional texture that accommodates the particle numbers is called an "index pool texture." In the example of the present embodiment, the system is devised so that one texel is assigned to one voxel. In this case, the number of texels in the two-dimensional texture is the maximum number of texels that can be stored in the index pool texture.

Step of Determining the Bounding Box S12

Figure 7:
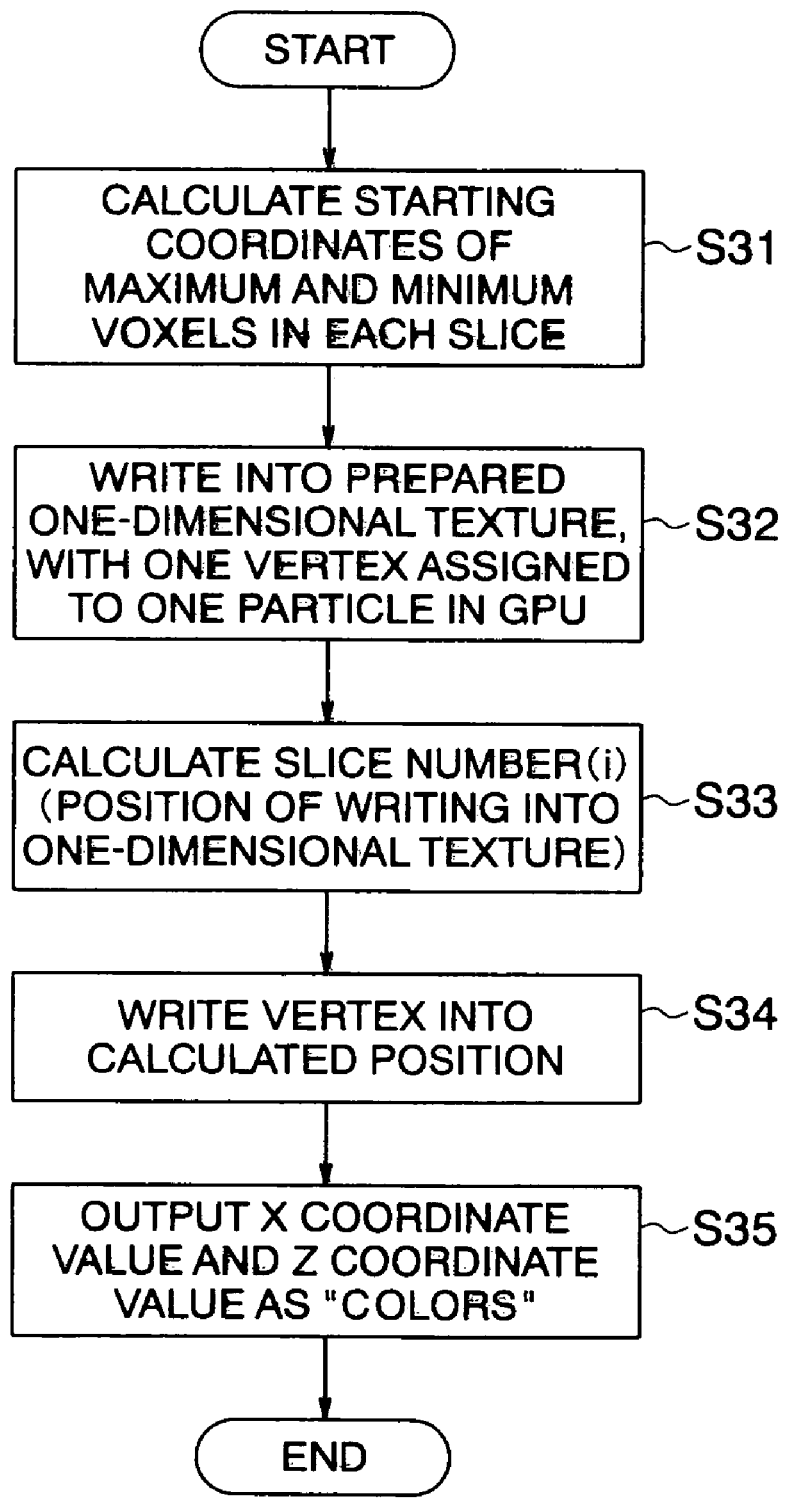
FIG. 7 is a flow chart showing a more concrete procedure for the step of determining the bounding box.

Next, the procedure used to determine the bounding box will be described with reference to the processing flow shown in FIG. 7. In order to determine the bounding boxes in the slices 31a, the starting coordinates of the maximum and minimum voxels in each slice are first calculated (step S31). In the processing of this calculation, this is accomplished by calculating the numbers of the slices to which these particles belong from the Y coordinate values of the particles, and calculating the maximum values and minimum values of the coordinates of the particles present in the respective slices. Since the GPU 12 is used, one vertex is assigned to one particle in this GPU 12, and writing is performed in the one-dimensional texture prepared above (step S32).

In the vertex shader of the GPU 12, the slice numbers (i) are calculated from the Y coordinate values of the particles using the abovementioned Eq. (4), i.e., the positions of writing into the one-dimensional texture are calculated (step S33), and the vertices are written into these calculated positions (step S34). Then, in the fragment shader of the GPU 12, the X coordinate values and Y coordinate values are output as "colors" (step S35). Furthermore, selection of maximum values and minimum values can be performed using the alpha blending function of the GPU 12. On a stream processor on which a function to compare values, such as alpha blending, written from several processors, the operation can be performed by serializing the writing to the memory. On a stream processor with the capability of atomic write, it can be used to compare values written by several processors.

Step of Calculating Head Numbers S13

Ordinarily, the number of voxels in a slice can be calculated by using the maximum value and minimum value of the XZ coordinates of each of a plurality of these slices 31a. The calculation of the head numbers requires the calculation of Eq. (3) in each slice. When the stream processor can compute a prefix scan (Eq. (3)), it can be used. However, it is not available when implementing with shader on a GPU, another strategy have to taken. This means that in this processing, the values from $n_0$ to $n_{i-1}$ must be read out and calculated for each slice i. Assuming that the total number of slices is m, then, if a conventional calculation method is used, memory access is required (m(m+1))/2 times; accordingly, the processing speed is limited by the memory transfer rate.

Accordingly, in the calculation method of the present embodiment, this is executed by a function utilizing the vertex shader of the GPU 12.

Specifically, the number $n_i$ of voxels present in the slice i is read out (i+1), and is added to the lead number array of the m-th slice. In this way, the lead numbers can be calculated by accessing the memory m times. This processing is so-called "scattering operation," and can be performed using a vertex shader in cases where a GPU 12 is used. In cases where the number of slices is m slices, this processing is performed with the number of elements m written into a one-dimensional display. In other words, in cases where the GPU 12 is used, the processing is performed with writing performed in a one-dimensional texture comprising m texels. The processing in which the number of voxels $n_i$ present in each slice i is written into a head number array from the (i+1)-st through the m-th slice can be accomplished by drawing line segments from the (i+1)-st texel through the m-th texel.

If the function of the GPU 12 is used, the process outputs the number of voxels within the slice as a color in accordance with the function of the fragment shader. Furthermore, Eq. (3) can be evaluated by performing addition processing according to the alpha blending function of the GPU 12, and the head numbers of the respective slices can be calculated.

Figure 8:
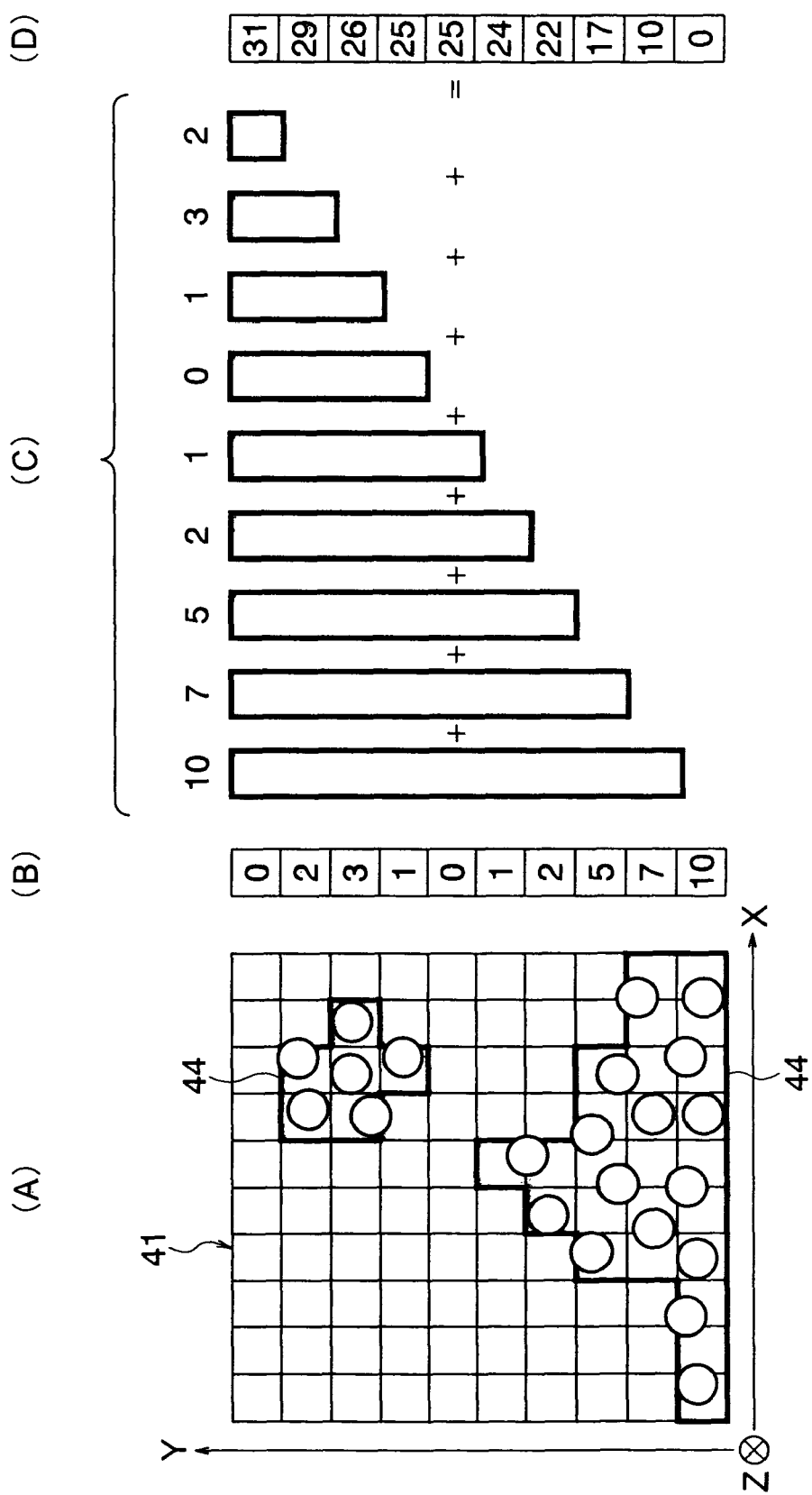
FIG. 8 is a diagram showing the approach of the "header number calculation" of the slice.

FIG. 8 shows a graphic illustration of the approach of the "calculation of the head numbers" of the slices. FIG. 8(A) shows the same content as that of FIG. 4(B). FIG. 8(B) shows the numbers of voxels contained in bounding boxes in each of (e.g.) 10 slices from bottom to top shown in (A) as indicated by numerical values in corresponding locations. FIG. 8(C) shows an image illustration of a state in which the numbers of voxels in the respective slices are added together. FIG. 8(D) shows cumulative vales relating to the total number of slides from bottom to top.

Step of Storing Values S14

The particle numbers are stored in an index pool texture using the slice head numbers calculated as described above and the values defining the bonding boxes.

Step of Reading Values S15

Figure 9:
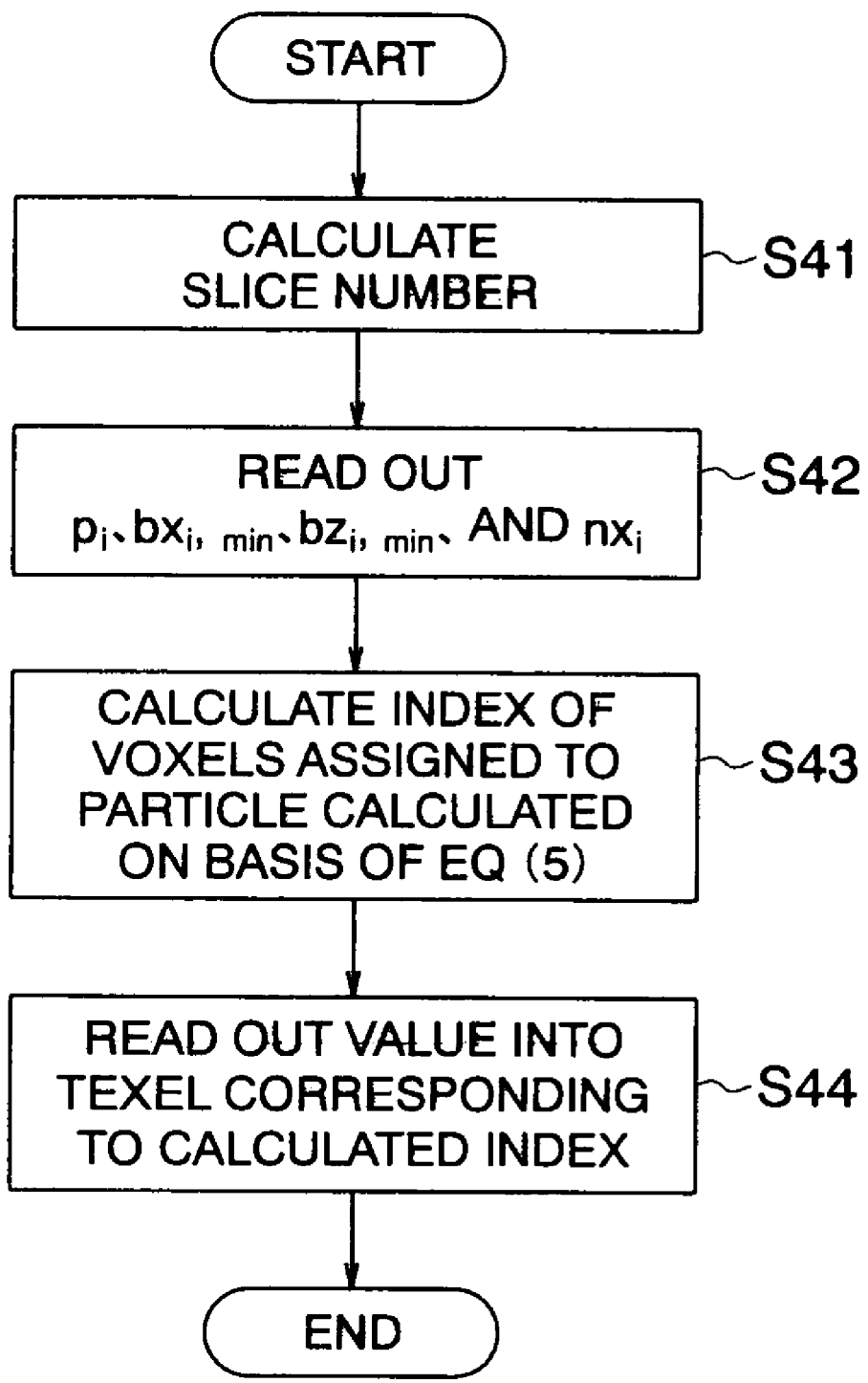
FIG. 9 is a flow chart showing a more concrete procedure for the step of reading the values.

Reference is now made to the processing flow shown in FIG. 9. The slice numbers are calculated from the Y coordinate values of the particles (step S41), and the head numbers $p_i$ of these slices, the minimum values $bx_{i,min}$ and $bz_{i,min}$ in the slices, and the voxel numbers $nx_i$ of the slices in the X axial direction are read out (step S42). Eq. (5) above is calculated using these values, and the indices of the voxels assigned to these particles are calculated (step S43). The writing of values into texels corresponding to the calculated indices is accomplished by reading out the particle numbers of these texels, with one vertex assigned to one particle (step S44).

The read-out of values stored in voxels in which certain coordinates are present is accomplished by calculating the indices of voxels in the same manner as in the storage of values from these coordinates, i.e., by calculating the memory addresses.

The calculation method of utilizing a sliced data structure in accordance with the present embodiment can be accomplished by the construction of a grid data structure for storing the particle numbers, and by performing the processing up to the storage of the particle numbers using the GPU 12; in this way, all of the steps of the particle-based simulation can be performed using the GPU 12.

The calculation method of the present embodiment does not use a fixed grid, and is not subject to the limitations of the calculation area; accordingly, calculations can easily be performed even in the case of a broad calculation space, and the memory can be efficiently used by excluding voxels in which no particles are present. Furthermore, even if the number of particles is increased, a particle-based simulation can be executed using the ordinarily used memory.

In the above embodiment, a case was described in which a shader was used in the loading of programs in the GPU. However, the present invention is not limited thereto; for example, loading can also be accomplished using some other programming model. Currently, besides the shader, a CUDA, CTM, Brook or the like can be used in the loading of programs in the GPU. These are used in common in the sense of the programming language in cases where a GPU is used as a streaming processor. In an example in which the shader is used, data relating to the slices, voxels, and particles in the calculation space used for calculations in the GPU 12 is stored in the video memory 13B as a texture 13B-1. However, in cases where a CUDA or the like is used, an "array" is generally used instead of a texture.

What is claimed is:

1. A system for carrying out a particle-based simulation by utilizing a sliced data structure for a space used in calculation of the particle-based simulation, wherein the space is a three-dimensional calculation space constructed from numerous voxels, the system comprising:
a streaming processor for (i) forming a plurality of two-dimensional sliced areas perpendicular to a single arbitrary axis in the three-dimensional calculation space, whereby the numerous voxels are divided by the plurality of two-dimensional sliced areas, and (ii) for calculating starting coordinates of each of maximum and minimum voxels for a range of voxels in which particles are present in each of the plurality of two-dimensional sliced areas, and thereby determining this range as a rectangular range surrounded by are angular shape; and
a memory for the voxels contained in the rectangular range of each of the plurality of two-dimensional sliced areas.

2. The system of claim 1, wherein a value that specifies the particles is stored in a storage element of the memory provided for the voxels in which the particles are present.

3. The system of claim 1, wherein the calculation of the voxel numbers v(x, y, z) of the voxels in which certain points (x, y, z) in the rectangular ranges of each of the plurality of two-dimensional sliced areas are present is performed using a value that defines the rectangular ranges of each of the two-dimensional sliced areas, a value that determines the slice number, or a header number.

4. The system of claim 1, wherein the calculation of the particle-based simulation is a calculation of a proximate particle search, and the three-dimensional calculation space is divided by the two-dimensional sliced areas in order to make the calculation of the proximate particle search more efficient.

5. The system of claim 1, wherein a graphic processing unit is used as the streaming processor to perform the calculation in which the three-dimensional calculation space is divided by the two-dimensional sliced areas for the calculation of the particle-based simulation.

6. A method for loading a particle-based simulation system utilizing a sliced data structure into a streaming processor, wherein a data structure is constructed for being used to increase efficiency of a calculation of a proximate particle search of the particle-based simulation, and storing data, which are required in order to perform the proximate particle search on the streaming processor using the data structure, into a video memory as an array, the method comprising steps of:
forming a plurality of two-dimensional sliced areas perpendicular to a single arbitrary axis in a three-dimensional calculation space constructed using numerous voxels, and dividing the numerous voxels by the plurality of two-dimensional sliced areas;
calculating respective starting coordinates of maximum and minimum voxels for a range of voxels in which particles are present in each of the plurality of two-dimensional sliced areas, and thereby determining a rectangular range for enclosing the voxel range using a rectangular shape;
preparing at least a one-dimensional array;
storing, in the elements of the array, four values that are minimally required in order to define each of the plurality of two-dimensional sliced areas;
preparing another at least one-dimensional array; and
storing a particle number of the particles in the other array.

7. The method of claim 6, wherein the four minimum values are the number pi of the head voxel in an arbitrary two-dimensional sliced area (i), the starting coordinates $bx_{i,min}$ and $bz_{i,min}$ of the minimum voxel, and the number of voxels $nx_i$ in a specified axial direction.

8. The method of claim 6, wherein a texture is used as the array when a shader is used in the loading of program into a graphic processor unit used as the streaming processor.

* * * * *